United States Patent [19]

Priddy

[11] Patent Number: 4,600,305

[45] Date of Patent: Jul. 15, 1986

[54] DYNAMIC ENERGY CENTROID LOCATOR AND PROCESSOR (DECLP)

[75] Inventor: Randolph W. Priddy, Huntsville, Ala.

[73] Assignee: The United States of America as represented by the Secretary of the Army, Washington, D.C.

[21] Appl. No.: 641,904

[22] Filed: Aug. 20, 1984

[51] Int. Cl.⁴ .......................... G01B 11/26; G01C 1/00
[52] U.S. Cl. .................................... 356/152; 244/3.16
[58] Field of Search .............. 356/141, 152; 244/3.16; 350/101

[56] References Cited

U.S. PATENT DOCUMENTS

| | | | |
|---|---|---|---|
| 3,761,180 | 9/1973 | Maxwell et al. | 356/152 |
| 3,799,676 | 3/1974 | Chatterton | 356/152 |
| 3,907,433 | 9/1975 | Nault | 356/152 |
| 3,915,575 | 10/1975 | Sick | 356/152 |
| 3,927,480 | 12/1975 | Robertsson | 356/152 |
| 3,992,629 | 11/1976 | Chapman | 244/3.16 |
| 4,040,744 | 8/1977 | Schertz et al. | 356/152 |
| 4,422,758 | 12/1983 | Godfrey et al. | 356/152 |

Primary Examiner—S. C. Buczinski
Attorney, Agent, or Firm—Anthony T. Lane; Robert P. Gibson; Robert C. Sims

[57] ABSTRACT

The laser source energy and the target source energy goes through a common optical path to a beam splitter. The energy from the target source is filtered, allowing only the laser information to pass through to the laser quadrant detector. The second path from the beam splitter has a blocking filter to block the laser energy, and the remaining energy, that of the target source, is measured by the target quadrant detector. The geometric translator is a computer controlled azimuth and elevation gymbal device which tracks (drivers to null) the target source. The target source is a strobe lamp. The angular information from the dual quadrant detectors and the geometric translator are fed into an compact mini-computer.

6 Claims, 3 Drawing Figures

DYNAMIC ENERGY CENTROID LOCATOR AND PROCESSOR (DECLP)

DEDICATORY CLAUSE

The invention described herein may be manufactured, used, and licensed by or for the Government for governmental purposes without the payment to me of any royalties thereon.

BACKGROUND OF THE INVENTION

The U.S. Army has a family of missile systems and associated laser designator systems to provide weapons known as Terminal Homing Laser Designator Weapon Systems. The success of these missile systems is directly related to the ability to precisely aim laser designator energy at a target. Error budgets which must be assessed include the pointing error of the systems, performance of the missile, stabilization of the laser spot, tracking performance of the designator, boresight of the designator, and the effects of turbulence and obscurants. Encoder readouts on the designator platform (i.e., airborne or ground laser designator) would only provide information as to where the designator was pointed, and not where the laser beam hit the target. The difference would be due to the effects of the atmosphere on the beam as well as the boresight alignment between the optical sight and the laser designator. In order to measure these errors within a few centimeters, instrumentation separate from the laser designator under test (i.e., resolver encoders within the designator) was necessary.

The most common method of measuring the position of a designator spot on a target is to use a television camera whose vidicon tube is sensitive to the wavelength of the laser energy emitted by the designator. Video data from the camera is stored on standard video tape for visual or computer analysis. Because of the sensitivity of the cameras and the time required for data reduction, other techniques of data collection and analysis are necessary.

SUMMARY OF THE INVENTION

The Dynamic Energy Centroid Locator and Processor is an instrumentation system used to accurately measure the centroid of pulsed energy emissions from a moving planer surface while simultaneously processing the measurement data to resolve the vertical and horizontal position in terms of target geometry. The invention consists of two radiometers which quantatively resolve energy in each quadrant of a single multi-detector unit and thus serves as a device to determine the relative location of the centroid of radiating energy as a function of a known energy source mounted on a mobile target. This device discriminates between two different wavelengths using a beam splitter which selectively filters and reflects two radiant energy sources whose geometric positions on a target are known.

DESCRIPTION OF THE BEST MODE AND PREFERRED EMBODIMENT

Figure 1:
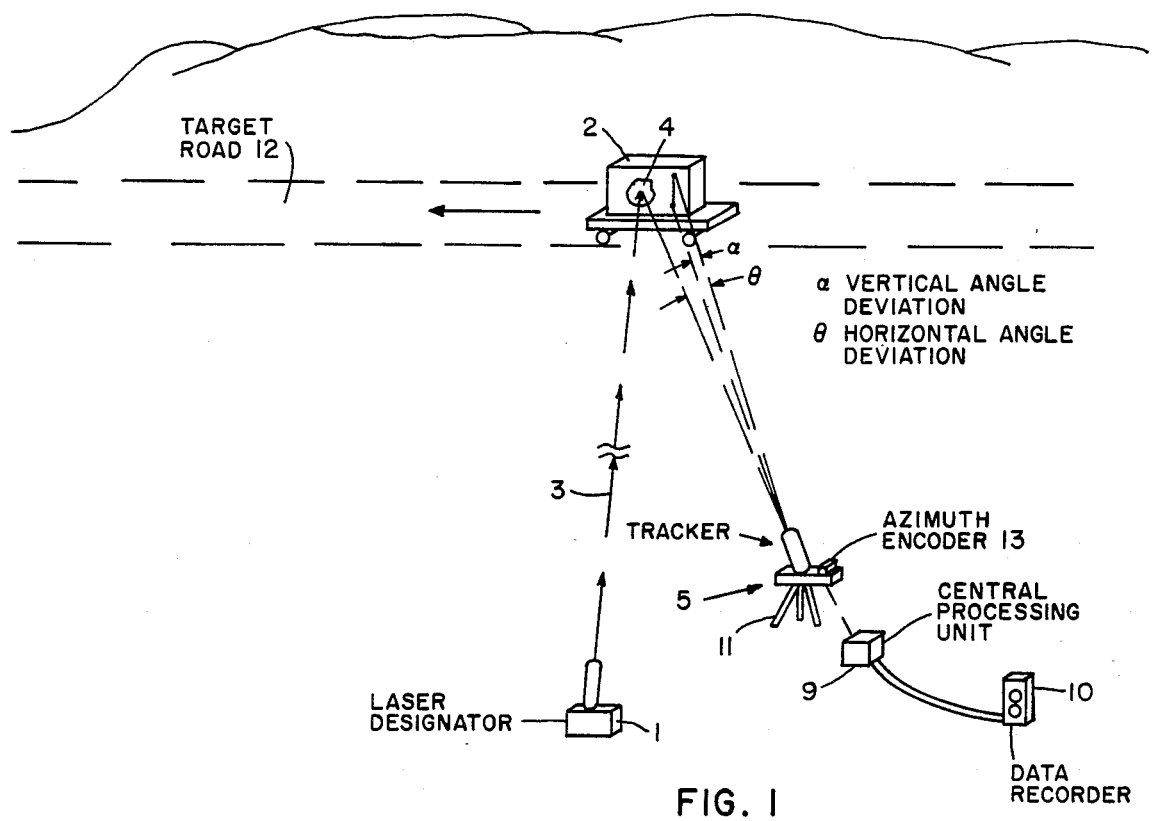
FIG. 1 is a diagrammatic illustration of the present invention.
Figure 2:
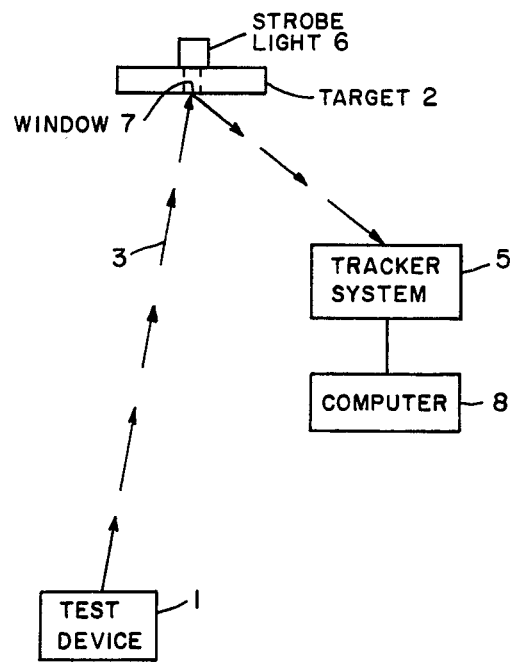
FIG. 2 is a block diagram of a top view of the present invention.

FIGS. 1 and 2 illustrate the basic configuration of the present invention. A laser designator 1 indicates the system under test. This test device 1 can be any of the laser illuminators known in the art. Such devices can be shoulder mounted, hand held, turret mounted, helicopter mounted, etc. The operator of the test device will aim the device at a center point of the target 2 in the attempt to keep it centered on the target throughout the test. A part of the test is the amount of error caused by the operator in his operation of the test device. A further major cause of error is due to atmospheric variation between the test device and the target. A laser beam 3 from the test device 1 will illuminate a spot 4 on the target. A tracker system 5 is provided for detecting the position of the spot with respect to the center of the target. A strobe light 6 is attached to the target 2 and will pass its light energy through a window 7 which is located in the center of the target. The tracker 5 uses the information coming from the strobe light 6 to feed information to the computer 8 or central processing unit 9 as to where the center of the target is at any given time. A data recorder 10 may be provided for gathering permanent information.

The tracker 5 is mounted on a high precision gimbal mount 11 which allows only azimuth movement of the sensor portions of the tracker 5. The tracker 5 is axially aligned with the center of the target before the test is run. The target 2 travels along a road 12 which is level so as not to cause any vertical movement of the center of the target. Test device 1 is located a great distance from the target relative to the distance the tracker 5 is located. Any atmospheric disturbance of the laser beam from the test device to the target will be measured by the tracker; however, any atmospheric disturbance from the target to the tracker will not be a factor in that the reflection of the laser beam and the travel of the light from the strobe follows an identical path to the tracker 5.

The data collection configuration during operation consists of the instrument 5 positioned some distance away from a target 2 but close compared to the distance the laser device 1 is positioned from the target. The target will be lased and the reflected energy measured. A strobe light 6 will be mounted in the center of the target to provide relative position in terms of the laser spot energy controid. The radiation from the strobe light will pass through a small window located in the center of the target to the window and is about 5% of the size of the laser spot. The target is about 2.3 meters square. A variety of strobe elements are suitable, for example radiant energy from the mercury vapor lamp is satisfactory. The window 7 has the same reflectivity as the target surface with respect to reflection of the laser source. In a typical application this strobe marker would be pulsed at approximately 500 pulses per second. The laser, however, will be somewhere between 10 and 20 pulses per second.

Figure 3:
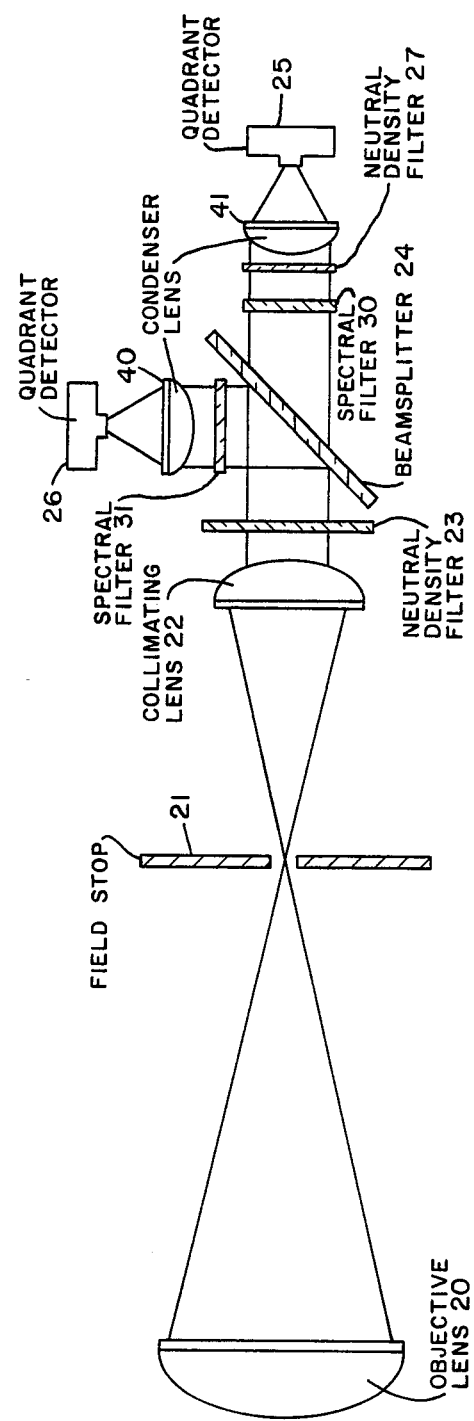
FIG. 3 is a diagrammatic illustration of the centroid locator and processor optical components.

Both energy sources will follow the same optical path from the target to detector 5. Referring to FIG. 3, the energy goes through objective lens 20, field stop 21, collimating lens 22, and neutral density filter 23 to a dichroic beam splitter 24. The beam splitter 24 will separate energy into a first quadrant detector 25 which will measure the centroid 4 of the target energy whereas the other portion of the energy will be fed to a second quadrant detector 26 which will fix the location of the strobe indicator. Filter 23 is a variable device which is set to compensate for energy levels caused by atmosphere and other variables in the test. Filter 27 does the same but only works on the laser beam variables. Total energy density per steradian of each energy type will be determined by summing the energy incident in each quadrant for each specific detector system.

The tracker system 5 includes an azimuth encoder which is part of the system and senses the horizontal and vertical orientation of the instrument. By knowing the geometry of the target and the distance between the strobe indicator 7 and the target energy centroid 4, the relative position of the target centroid can be resolved in terms of horizontal and vertical deviations on the target.

The instrument is microprocessor 9 supported which permits rapid analysis of the data in a multiplex mode using the automatic data processing capability built into the instrument. This includes such things as the algorithms for the analysis, calibration tables and vector distances of the mobile target. A HP A600 compact mini-computer 8 is used.

In operation of FIG. 3 the energy is reflected from target and generated by the strobe in the target are collected by lens 20 and antenuated by filter 23 to a valve acceptable by the system. Beam splitter 24 divides the energy into two parts which are separately fed to quadrant detectors 25 and 26. The spectral filters 30 and 31 are provided for filtering out all frequencies except the laser frequency for detector 25 and strobe frequency light for detector 26. This allows the energy to use the same optical path from the target to the tracker system and, therefore, eliminate any variations due to different optical paths and atmospheric conditions which would occur if different optical paths were used. This also eliminates different distance traveled which would vary as the target travels.

Tracker 5 can be automatically guided by well known systems, not shown, onto the energy of the strobe which is located at the center of the target. Any errors in the tracking of tracker 5 will be indicated by quadrant detector 26 which can also be used to drive the automatic system. Therefore, even if the tracking device is not centered on the target the computer 8 will have the information as to the location of the strobe or center of the target and can utilize the information for accurately locating the laser illumination spot 4 relative to the center of the target. All of this information will provide a plus or minus error which can be attributed to the test device, the operator, atmospheric conditions, etc.

Feautures that are unique to this invention are:

a. The use of a single optical path for composite multi-spectral radiant energy which is separated into two selected wavelength components. One component is used to establish the orientation and geometric position of a target while the other component is used to establish the position of the centroid of an energy beam incident on the target surface.

b. The use of quadrant detectors for detecting and measuring the intensity of energy radiating from a specified target. The use of multiplex processing techniques provide concurrent analysis of the electrical signals from the detector. Analysis involves both digital and analog algorithms to provide relatively continuous information as to position, intensity and geometric orientation of the target and radiant energy centroid.

c. The use of a high precision gimbal mount which is instrumented to provide highly accurate azimuth and elevation measurement of the DECLP in terms of known geographic reference points.

This invention does not require digitized image analysis, has a single optical path and is not as sensitive to saturation as are imaging systems. It is particularly adapted to data collection used in the testing and evaluating of guided missile systems. These include laser guided systems, wire guided systems, and imaging systems. The invention is portable, easily calibrated and permits immediate analysis of the data in the field and under the conditions which the data was collected.

I claim:

1. A testing system for testing a laser designator which is designed to illuminate a spot on a target and maintain the spot in the center of the target comprising a reference electromagnetic energy source located on the target and radiating reference electromagnetic energy out from a center portion of said target; said laser designator being remotely located from said target and illuminating a spot on said target with a laser beam; a measuring device located spatially from said target so as to receive radiation reflected from the spot illuminated by said laser beam and to receive said reference electromagnetic energy; said reference electromagnetic energy and said reflected laser energy following the same optical path from said target to said measuring device; and said measuring means measuring the location of the spot illuminated by said laser beam relative to the location of said reference source and therefore relative to the center of said target.

2. A system as set forth in claim 1 wherein said reference electromagnetic energy and said laser beam have different frequencies; first and second detectors in said measuring device; said detectors being located to receive electromagnetic energies from said target; first and second filter means for allowing only radiation reflected by said laser beams to enter said first detector means and allowing only electromagnetic energy from said reference electromagnetic energy source to enter said second detector; and said detectors providing information as to the location of the energy it receives relative to a pointing position of said measuring device.

3. A system as set forth in claim 2 wherein said measuring means further has a beam splitter for splitting the energy received by said measuring device into said first and second detectors.

4. A system as set forth in claim 3 wherein said target contains a window which is relatively small compared to the size of the spot illuminated by said laser designator; and said window passing the frequency of said reference electromagnetic energy and reflecting the energy from said laser beam.

5. A system as set forth in claim 4 wherein said measurement device further has variable neutral density filters located to adjust the intensity of the electromagnetic energy entering into the first and second detectors.

6. A system as set forth in claim 5 wherein processing devices are connected to the outputs of said detectors for determining the accuracy of the laser designator.

* * * * *